United States Patent [19]

Sugalski

[11] 4,369,571

[45] Jan. 25, 1983

[54] SHUTTLE PLATE GUIDE FOR AUTOMATIC WINDING MACHINES

[75] Inventor: Raymond K. Sugalski, Gainesville, Fla.

[73] Assignee: General Electric Company, Gainesville, Fla.

[21] Appl. No.: 126,705

[22] Filed: Mar. 3, 1980

Related U.S. Application Data

[63] Continuation of Ser. No. 888,535, Mar. 21, 1978, abandoned.

[51] Int. Cl.³ .............................................. B23P 19/04
[52] U.S. Cl. ..................................... 29/731; 29/623.1; 29/56.1
[58] Field of Search .................. 29/731, 730, 623.1, 29/623.2, 564.1, 806, 819; 271/269, 268, 267, 131; 429/94; 242/56.1

[56] References Cited

U.S. PATENT DOCUMENTS

| | | | |
|---|---|---|---|
| 1,963,381 | 6/1934 | Purdy | 242/56.1 |
| 2,324,523 | 7/1943 | Lund | 29/730 |
| 3,815,188 | 6/1974 | Pietro | 242/56.1 |
| 3,829,952 | 8/1974 | Trask | 29/731 |
| 4,026,000 | 5/1977 | Anderson | 29/623.1 |
| 4,060,937 | 12/1977 | Glazer | 271/267 |
| 4,080,732 | 3/1978 | Eberle | 29/623.1 |

FOREIGN PATENT DOCUMENTS

| | | | |
|---|---|---|---|
| 864355 | 2/1971 | Canada | 242/56.1 |
| 949580 | 2/1964 | United Kingdom | 242/56.1 |

Primary Examiner—Daniel C. Crane
Attorney, Agent, or Firm—Henry J. Policinski

[57] ABSTRACT

An apparatus for feeding separator strips and plate blanks to an automatic battery cell winding machine, the apparatus having a frame member, guide means on the frame member for guiding a separator strip, a clamp for clamping the separator strip, feeding means, including an air cylinder, for advancing the clamp and the clamped separator strip, a platform mounted to slide on the frame member for receiving a plate blank, means for pushing the platform along the frame member for feeding the plate blank to the separator strip and a spring tensioned as the platform is advanced along the frame member for retracting the platform when the pushing means is released.

7 Claims, 7 Drawing Figures

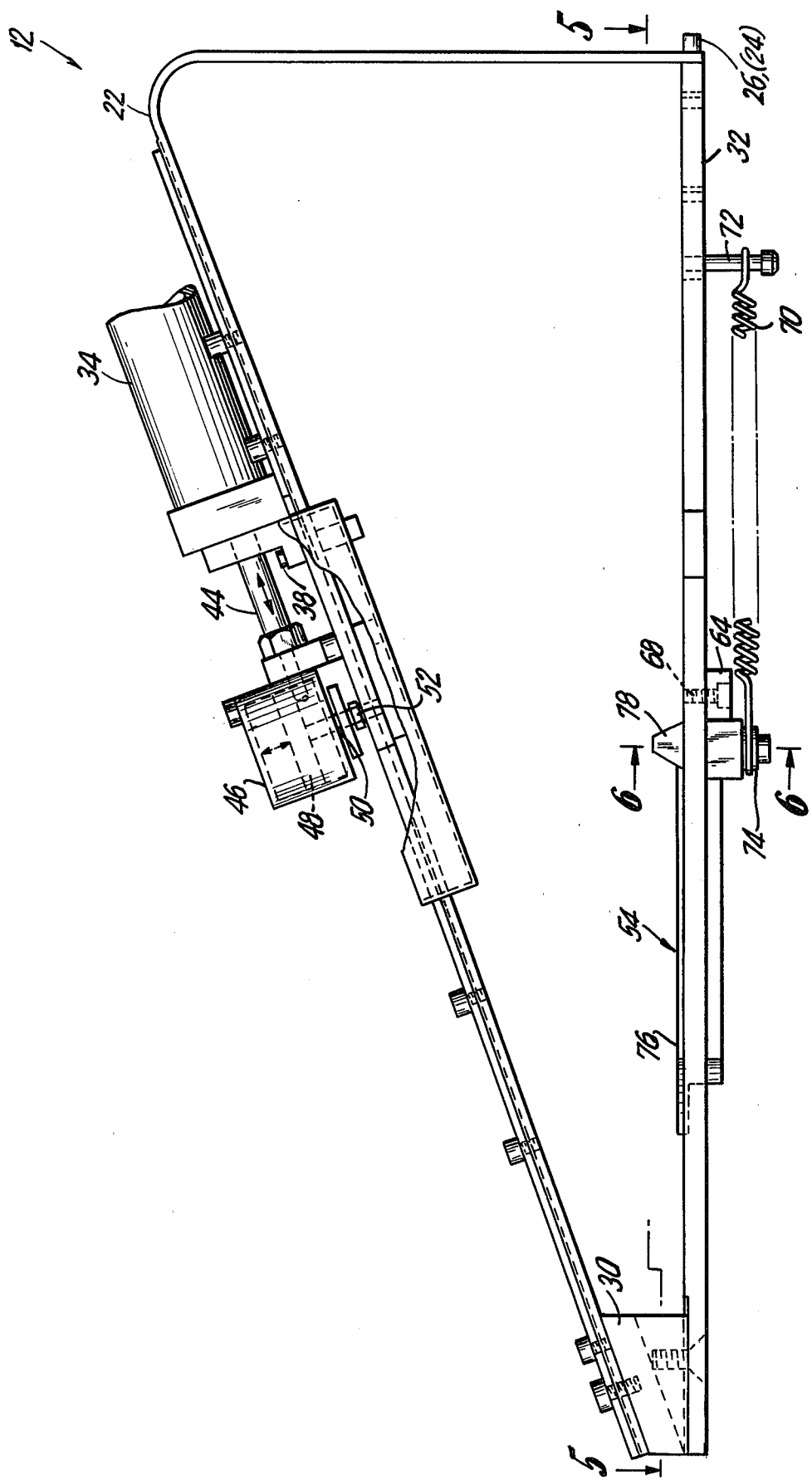

SHUTTLE PLATE GUIDE FOR AUTOMATIC WINDING MACHINES

This is a continuation, of application Ser. No. 888,535 filed Mar. 21, 1978.

This invention relates to apparatus for feeding a winding machine and, more particularly, to apparatus for feeding separator strips and plate blanks to an automatic machine for winding battery cells.

In the manufacture of battery cells, for example nickelcadmium battery cells, the positive and negative plates, with separators, are wound into a coil, inserted into a container, electrolyte is added to the container, the container is closed and the battery, with the plates connected to the container and positive terminal, respectively, is charged. The present invention is concerned with the winding of the plates and separators into a coil and, more particularly, to the feeding of the plates to the coil winding apparatus.

It is usual practice in the automatic and semi-automatic production of battery cells, such as, for example, nickel-cadmium battery cells, to fabricate the positive and negative plate blanks, to cut the blanks into plate size and to feed such cut blanks, in cell length, along with the separator material, to a winding arbor. The arbor winds the plates and separator strips into the required coil.

The positive and negative plate blanks fed to the arbor which, in the instance of some cells to be wound, may be relatively small, are positioned between strips of separator fed from supply rolls to the arbor. After the plates and separators are wound in the coil, the coiled separators are severed from the separator supply rolls.

Feeding of the plate blanks to the separator strips and the positioning and registry thereof with such strips, especially in the instance of smaller cells, can be difficult. Proper positioning and registry of the plate blanks with the separator and relative to each other is, of course, critical to the production of an acceptable battery cell and for the prevention of short circuits between the plates therein or the cell container or positive terminal. Positioning and registry of the plate blanks with the separators and with each other is particularly difficult in the automatic or semi-automatic winding of plates and separators in the smaller battery cell sizes.

Many of the difficulties heretofore encountered in positioning and registering negative and positive plate blanks with the separators and with each other for winding such plate blanks and the separators into a battery plate cell are overcome by the apparatus of the instant invention which guides and feeds at least one of the plate blanks to the arbor after winding of the separators has been initiated.

The invention of the instant application will be more completely described and more fully understood from the following description of a preferred embodiment of the invention taken with the appended drawings, in which FIG. 1 is a side elevational view of the apparatus of the instant invention;

FIG. 3 is an enlarged side-elevational view of one of the feeder assemblies of FIG. 1;

The apparatus of the present invention is particularly suited for the feed of plate blanks to the arbor of an assembly machine such as shown in U.S. patent application Ser. No. 783,087, filed Mar. 31, 1977 now U.S. Pat. No. 4,203,206 and may be employed for feeding one of the plate blanks or both plate blanks. In the embodiment illustrated in FIG. 1, the instant apparatus is employed for the feeding of both the positive and the negative plate blanks, as well as both separators, to the assembly machine arbor. Thus, two identical units are shown, one for feeding the positive plate blank and its separator and the other for feeding the negative plate blank and its separator. While two such identical units might be so employed in such assembly machine, in most machines the feed unit as shown in the '087 application might be employed to feed one plate and its separator and the feed unit of the instant application might be employed for the feed of the other plate and separator.

Figure 1:
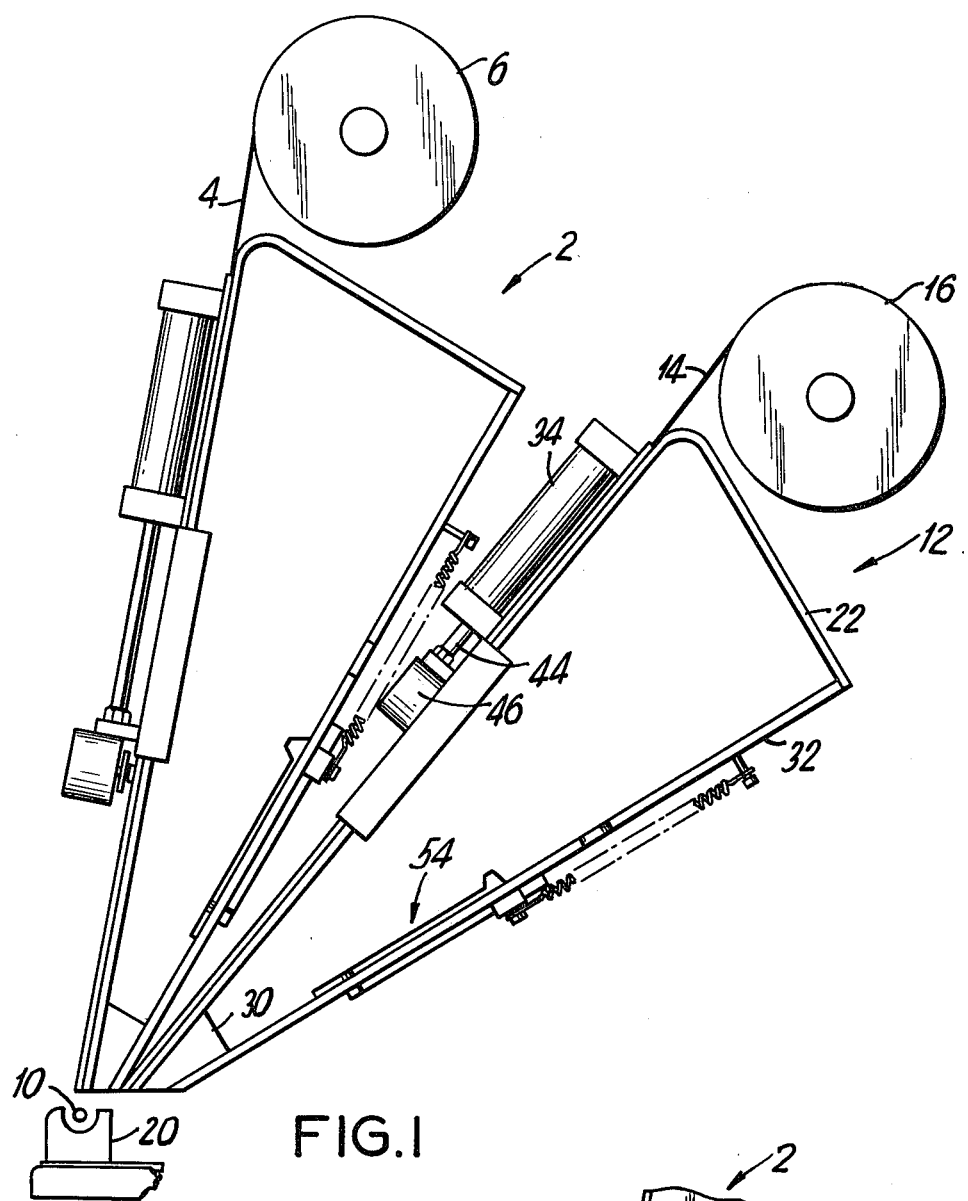
Figures 2, 2A:
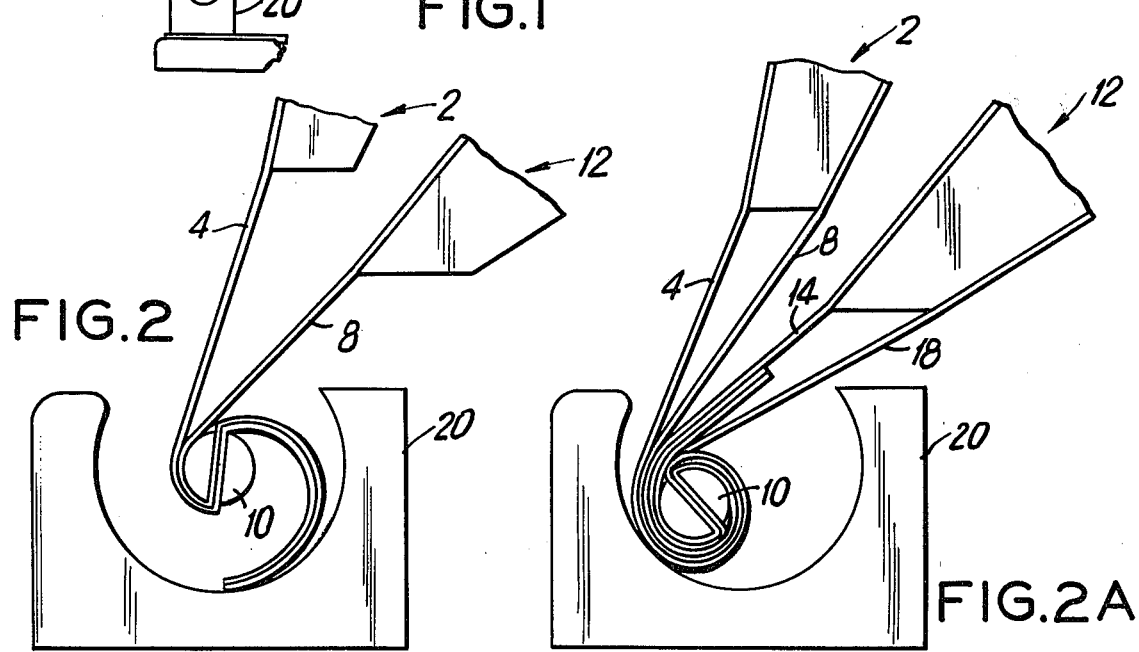
FIG. 2 is an enlarged view of a portion of the apparatus of FIG. 1 and showing initial feed of the separator ends into the arbor and coil.
FIG. 2A is an enlarged view, similar to FIG. 2, but showing the feed of the separator ends at a later point in such feed and at the initial feed of the plate blanks.
Figure 4:
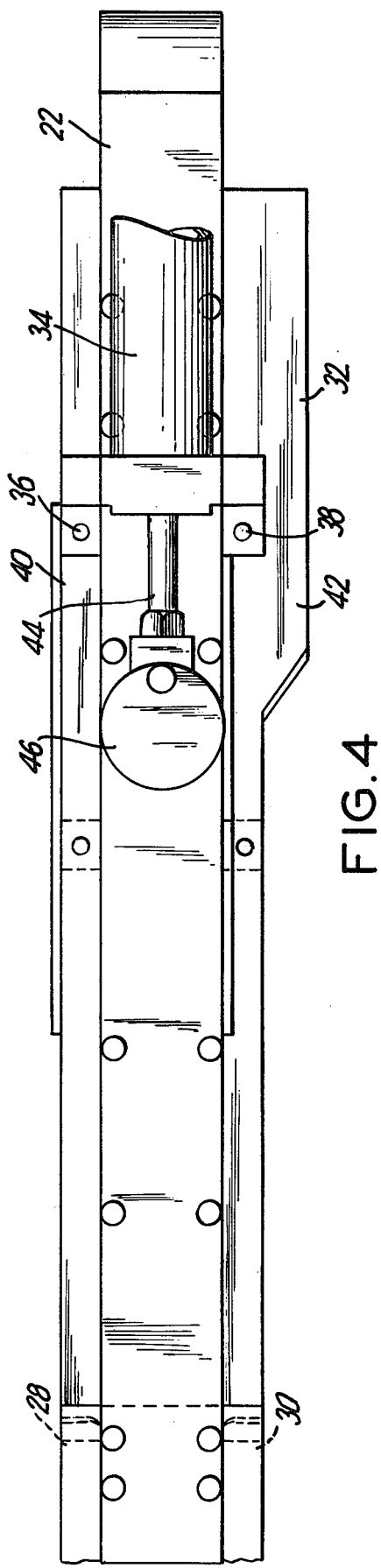
FIG. 4 is a top view of the feeder assembly of FIG. 3.
Figure 5:
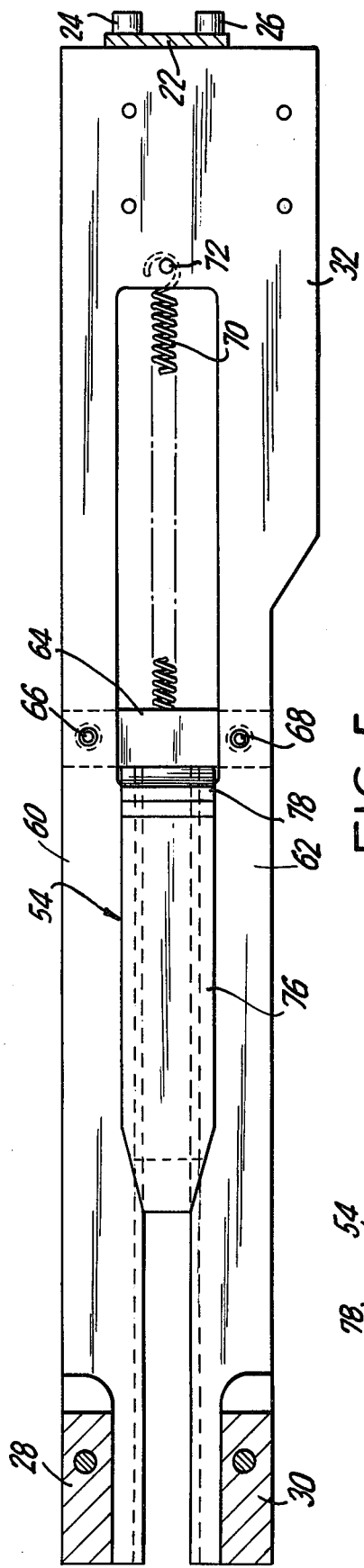
FIG. 5 is a view, partly in section, taken at 5—5, FIG. 3.

Referring to the drawings, particularly, FIGS. 1, 2 and 2A, the feed unit, generally designated 2, feeds separator strip 4 from roll 6 and plate blank, diagrammatically illustrated 8, FIG. 2A, to winding arbor 10. Feed unit, generally designated 12, feeds separator strip 14 from roll 16 and plate blank, diagrammatically illustrated 18, FIG. 2A, to winding arbor 10. The operation of arbor 10 and the cooperation thereof with nest 20 in the winding of the cell coil or roll is described in the '087 application which description is incorporated herein by reference.

Referring now to FIGS. 3-6, the feed unit of the present invention includes upper frame member 22 connected by screws 24, 26, and spacers 28, 30 to lower frame member 32. Air cylinder 34 is mounted by bolts 36,38 on guides 40,42 at the opposite edges of upper frame member 22. Piston rod 44 of air cylinder 34 is connected to the housing of air cylinder 46, air cylinder 34 and piston rod 44 advancing and retracting air cylinder 46 along frame member 22 between guides 40,42 as air cylinder 34 is actuated to advance and retract piston rod 44. Piston 48 of air cylinder 46 is connected by piston rod 50 to separator clamp member 52 for purposes more apparent later herein.

Figure 6:
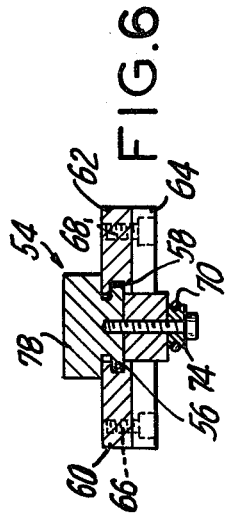
FIG. 6 is a view, partly in section, taken at 6—6, FIG. 3.

Plate sled, generally designated 54, is mounted in guideways 56,58 of guides 60,62, FIG. 6, for sliding movement along lower frame member 32. Stop 64 is fixed by screws 66,68 to frame member 32. Spring 70, fixed at one of its ends to post 72 mounted on frame member 32 and, at its other end, to post 74 mounted on sled 54, biases sled 54 toward and into engagement with stop 64 for reasons more apparent later herein.

The upper surface of sled 54, at 76, forms a platform for receiving a plate blank. At the rear end of surface 76, sled 54 has a raised finger surface 78, which may be knurled for better friction.

In the operation of the assembly machine with the feed unit of the present invention, separator strip 14 is fed from roll 16 under air cylinders 34,46 and clamp member 52 on upper frame member 22 between guides 40,42. Air cylinders 34,46 are operated in unison. Thus, clamp 52 engages separator strip 14 and, as air cylinder 46 is advanced along frame member 22 by piston rod 44 and air cylinder 34, the end of the separator strip is fed to arbor 10.

Preferably, for reasons more apparent later herein, air cylinders 34,46 are actuated to advance and hold a limited portion, at the leading end, of separator strip 14 to arbor 10. As such limited portion of separate strip end is being fed and before further separators feed, the plate blank to be coiled with the separator is placed on and aligned with sled surface 76 by the operator. After this is done, the operator, with his finger, pushes sled 54 forward, advancing sled 54 and the plate blank toward the arbor. The leading end of the plate blank projects beyond the forward end of sled 54 and, hence, comes into contact with the separator at arbor 10. The assembly machine is then set to continue the advance of separator strip 14 and the winding of the separator strip, now with the plate end, into the cell coil. When the plate blank and the prescribed length of separator strip have been coiled by arbor 10, cutting means, such as a hot wire, severs the end of the coiled separator strip from strip 14 remaining in frame member 23 between guides 40, 42. Sled 54 which is released by the operator after coiling of the separator and plate blank commences, is returned by spring 70 to stop 64. The operation is repeated for the next plate blank and separator to be wound.

There are, of course, a positive plate blank, a negative plate blank, and two separators all of which are wound or coiled together to make up a cell. Each of the plate blanks, with its separator, might be simultaneously fed to the arbor or coil with a unit of the instant invention or one of the blanks might be fed, such as by gravity along a slide, as in the apparatus of the '087 application and the other blank might be fed with the feed unit of the instant application.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In an apparatus for feeding and guiding a separator strip and a battery plate blank to an arbor for coiling said strip and blank into a coil, the apparatus having an arbor for receiving the end of a separator strip and a battery plate blank and for coiling said strip and said blank into a coil, a first frame member, a second frame member, said first and said second frame members converging toward said arbor, feed means on said first frame member for feeding a separator strip along said first frame to said arbor, platform means on said second frame member for receiving a plate blank, means on said platform means for pushing said platform means along said second frame member for feeding a plate blank thereon to said separator strip and said arbor, means for retracting said platform means when said pushing means is released, and wherein said second frame member includes guide means for said platform means and said retracting means includes a spring which is tensioned as said platform is pushed along such second frame member and which retracts said platform means when said pushing means is released.

2. In an apparatus, as recited in claim 1, in which said second frame member includes stop means for engaging and stopping said platform means when said platform means is retracted and reaches its initial position.

3. In an apparatus, as recited in claim 2, in which said second frame member includes a guideway and means on said platform member in engagement with said guideway.

4. In an apparatus, as recited in claim 3, in which said first and second frame members feed and guide said separator and said platform means with said plate blank thereon along convergent paths to said arbor.

5. In an apparatus for feeding and guiding a separator strip and a battery plate blank to an arbor for coiling said strip and blank into a coil, an arbor for receiving the end of a separator strip and a battery plate blank and for coiling said strip and said blank into a coil, a frame member, feed means for feeding a separator strip to said arbor, platform means on said frame member for receiving a plate blank, said frame member being directed toward said arbor, means on said platform means for pushing said platform means along said frame member for feeding a plate blank thereon to said separator strip and said arbor and means for retracting said platform means when said pushing means is released, said frame member including guide means for said platform means, and said retracting means including a spring which is tensioned as said platform means is pushed along said frame member and which retracts said platform means when said pushing means is released.

6. Apparatus as recited in claim 5, wherein said frame member includes stop means for engaging and stopping said platform means when said platform means is retracted.

7. Apparatus as recited in claim 6, wherein said platform means includes means for engagement with said guide means.

* * * * *